United States Patent
Malheurty et al.

(10) Patent No.: US 10,214,645 B1
(45) Date of Patent: Feb. 26, 2019

(54) POLYMER BLEND FOR CABLE JACKETS

(71) Applicant: NEXANS, Courbevoie (FR)

(72) Inventors: Laureene Malheurty, Macon (FR); Didier Billemaz, Nievroz (FR)

(73) Assignee: Nexans, Courbevoie (FR)

( * ) Notice: Subject to any disclaimer, the term of this patent is extended or adjusted under 35 U.S.C. 154(b) by 0 days.

(21) Appl. No.: 15/675,120

(22) Filed: Aug. 11, 2017

(51) Int. Cl.
*H01B 3/00* (2006.01)
*C08L 75/04* (2006.01)
*H01B 7/295* (2006.01)

(52) U.S. Cl.
CPC .............. *C08L 75/04* (2013.01); *H01B 7/295* (2013.01); *C08L 2201/02* (2013.01); *C08L 2203/202* (2013.01)

(58) Field of Classification Search
CPC ........................................................ H01B 3/00
USPC ........................................ 174/110 R, 110 SR
See application file for complete search history.

(56) References Cited

U.S. PATENT DOCUMENTS

| | | | | | |
|---|---|---|---|---|---|
| 4,000,362 | A | * | 12/1976 | Kawaguchi | H01B 7/0208 174/110 S |
| 5,462,911 | A | * | 10/1995 | Takao | B41M 5/42 428/327 |
| 2006/0231189 | A1 | * | 10/2006 | Ma | B32B 17/10018 156/99 |
| 2010/0044070 | A1 | * | 2/2010 | Schmidt | C08K 5/0066 174/113 C |
| 2017/0121502 | A1 | * | 5/2017 | Ni | C08K 3/22 |

* cited by examiner

*Primary Examiner* — Chau N Nguyen
(74) *Attorney, Agent, or Firm* — Sofer & Haroun, LLP

(57) ABSTRACT

A cable has one or more conductors and a jacket. The jacket is made from a composition including a polymer blend of thermoplastic polyurethane (TPU), and Polyvinylbutyral (PVB), with the ratio of PVB to TPU being up to 49% PVB by weight of the total weight of the polymer blend, the remainder of the polymer blend being TPU.

23 Claims, 4 Drawing Sheets

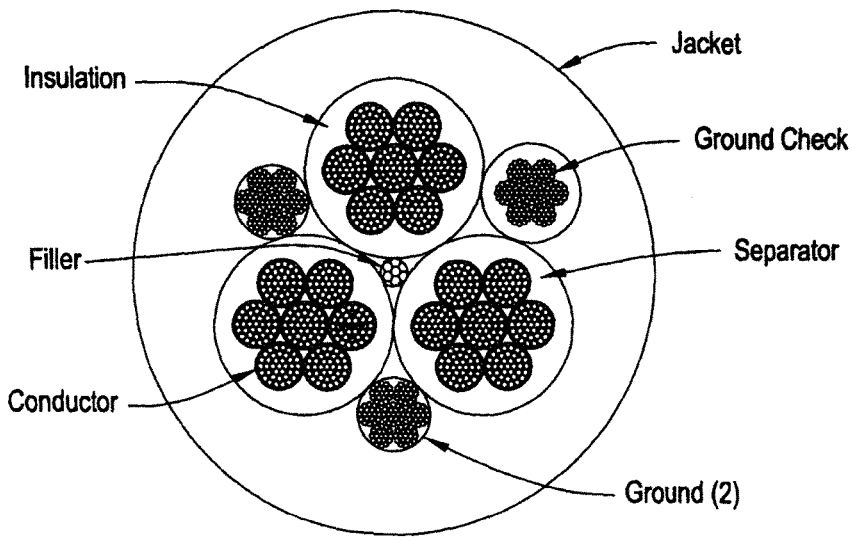

2 AWG 3/C 2kV ROUND G-GC
ORANGE TPU

|  |  | TYPICAL |
|---|---|---|
| CONDUCTOR: | 2 AWG 259W CLASS H TINNED COPPER. | OD. 0.321" |
| SEPARATOR: | POLYESTER TAPE OVER POWER CONDUCTORS. | |
| INSULATION: | 0.060" (MIN. AVG.) OF ETHYLENE PROPYLENE RUBBER COLORED FOR PHASE IDENTIFICATION (BLACK, WHITE, RED). | OD. 0.460" |
| GROUNDS (2): | 7 AWG 133W CLASS H TINNED COPPER COVER WITH A GREEN POLYESTER TAPE. | OD. 0.188" |
| GROUND CHECK: | 8 AWG 133W CLASS H TINNED COPPER COVERED WITH 0.045" (MIN. AVG.) OF YELLOW POLYPROPYLENE. | OD. 0.256" |
| OUTER JACKET: | APPX 0.170" OF ORANGE TPU. | OD. 1.340" |
| JACKET MARKING: | TIGER BRAND 2 AWG 600/2000V 3/C TYPE G-GC P-7K-184106 MSHA. | |
| APPRX. WEIGHT: | 1431 POUNDS PER 1000 FEET. | |
| VOLTAGE RATING: | 2000 VOLTS | |

FIGURE 1
(Prior Art)

TABLE 7

TABLE 8

TABLE 11

TABLE 12

POLYMER BLEND FOR CABLE JACKETS

BACKGROUND

Field of the Invention

This invention relates to a polymer blend for use as a cable jacket. More particularly this invention relates to a polymer blend for use as an abrasion and fire resistant cable jacket for heavy industry cables, such as mining cables, automation cables and the like.

Description of Related Art

Heavy equipment cables, such as mining cables or other industrial work site cables are subject to very rugged environmental conditions and operating parameters that include dragging and moving against rough surfaces. Such environmental stresses and abrasion can lead to failure of the primary outer insulation jacket.

Because of these conditions, mining cables, as one example, need to meet stringent safety standards. The Insulated Cable Engineers Association (ICEA) sets a standard that includes several mechanical thresholds for cable jackets ICEA S75-381. See Table 1 below.

Also, the MSHA (Mine Safety and Health Administration) sets forth the relevant fire safety standards in 30 CFR §§ 7.402 (definitions), 7.406 (test equipment) and 7.408 (test procedure and results requirements to pass).

In the prior art, the industry typically makes the jacket for these mining cables from thermoplastic polyurethane (TPU), chlorinated polyethylene (CPE), or polychloroprene rubber (CR). Compared with the later two, TPU based polymers have very good abrasion and tear resistance while meeting the required fire resistance standards. However, TPU polymer is quite expensive. Also, the other two polymers CPE and CR are halogenated and thus produce toxic smoke.

Also, elastomer solutions like CPE or CR have the additional disadvantage that they have to be crosslinked after extrusion, which results in additional working steps to finish the cable. This results in additional production costs and time in comparison to thermoplastics like TPU.

The following Table 2 shows a mechanical properties comparison between some standard elastomer solutions (CPE) and Hypalon® against basic natural rubber and TPU.

TABLE 1

ICEA S-75-381
Table 3-3
EXTRA-HEAVY-DUTY CROSSLINKED JACKETS AND THERMOPLASTIC POLYURETHANE

|  | Chlorinated Polyethylene | Neoprene | Nitrile butadiene/ Polyvinyl- chloride | Chlorosulfonated Polyethylene* | Thermoplastic Polyurethane |
|---|---|---|---|---|---|
| PHYSICAL REQUIREMENTS |  |  |  |  |  |
| Tensile Strength, min., psi | 2,400 | 2,400 | 2,400 | 2,400 | 3,700 |
| Tensile stress at 200 percent elongation, min., psi | 700 | 700 | 700 | 700 | 800 |
| Elongation at rupture, min., percent | 300 | 300 | 300 | 300 | 400 |
| Set, Max., percent | 30 | 20 | 30 | 30 | N/A |
| Tear resistance, min., ppi | 40 | 40 | 40 | 40 | 80 |
| AGING REQUIREMENTS |  |  |  |  |  |
| After air oven test at 100° C. ± 1° C. for 168 hours Tensile Strength, min., percentage of unaged value | 70 | 50 | 50 | 70 | 50 |
| Elongation at rupture, min., percentage of unaged value | 55 | 50 | 50 | 60 | 75 |
| After oil immersion test at 121° C. ± 1° C. for 18 hours Tensile strength and elongation, min., percentage of unaged value | 60 | 60 | 60 | 60 | 60 |
| ELECTRICAL REQUIREMENTS |  |  |  |  |  |
| Surface resistance, nonshielded cables min., megohms | 100 | 100 | 100 | 100 | N/A |

*Also known as Chlorosulfonyl Polyethylene

TABLE 2

TYPICAL VALUES

| | ICEA Minimums for EHD Jackets | Chlorinated Polyethylene (CPE) | Chloro-sulfonated Polyethylene (Hypalon*) | Thermoplastic Polyurethane (TPU) | Natural Rubber |
|---|---|---|---|---|---|
| Tensile Strength (PSI) | 2400 | 2900 | 3000 | 5000 | 3800 |
| Elongation @ Rapture % | 300 | 500 | 500 | 500 | 480 |
| Modulus PSI @ 200% | 700 | 900 | 900 | 1100 | 825 |
| Tear Strength lbs. per inch thickness | 40 | 50 | 50 | 120 | 86 |
| Abrasion Index per ISO 4649 | No Requirement | 70 | 74 | 15 | 56 |

It is noted that the "Abrasion Index" in the above table is not an ICEA standards requirement, but in any case it is an indication of the abrasion resistance of a jacket compound. It is a number measured per the standard ISO 4649 (International Organization for Standards), with lower numbers indicating higher resistance to abrasion. In severe mining applications an abraded jacket can lead to cable failure. Although abrasion is not an ICEA standards requirement, it is a useful element to consider when choosing a jacket material.

OBJECTS AND SUMMARY

The objective of the invention is to use a polymer blend combining PVB (Polyvinylbutyral—either virgin or recycled or a combination of the two) with TPU to form the jacket of a heavy equipment cable, such as a mining cable, industry automation cable or the like. The present arrangement, and the various formulations herein, are able to manage the fire resistance issues required by mining cable tests such as 30 CFR 7.408 and other fire tests used in heavy industry cables; maintain the required mechanical strength; all while achieving the desired cost cutting by limiting the amount of TPU used.

Polyvinylbutyral (PVB) foil is commonly used in the automotive and architectural fields to provide a protective layer between two panels of glass, such as windshields. PVB has many beneficial characteristics such as high flexibility, toughness and good clarity. Pure product pellets of PVB are used in blend with TPU to form the base polymer of the present arrangement.

In the case of recycled PVB, it is available in large quantities with a good quality level and very low rate of impurities. The use of recycled PVB in some embodiments may offer additional environmental and economic advantages in addition to better flexibility. Recycled PVB price is much more favorable than common TPU grades on market. Moreover using post consumer PVB is green compliant with eco-design approach and enables a lower carbon footprint.

BRIEF DESCRIPTION OF THE DRAWINGS

The present invention can be best understood through the following description and accompanying drawing, wherein:

FIG. 1 shows an exemplary mining cable with a jacket according to the prior art.

DETAILED DESCRIPTION

Figure 2:
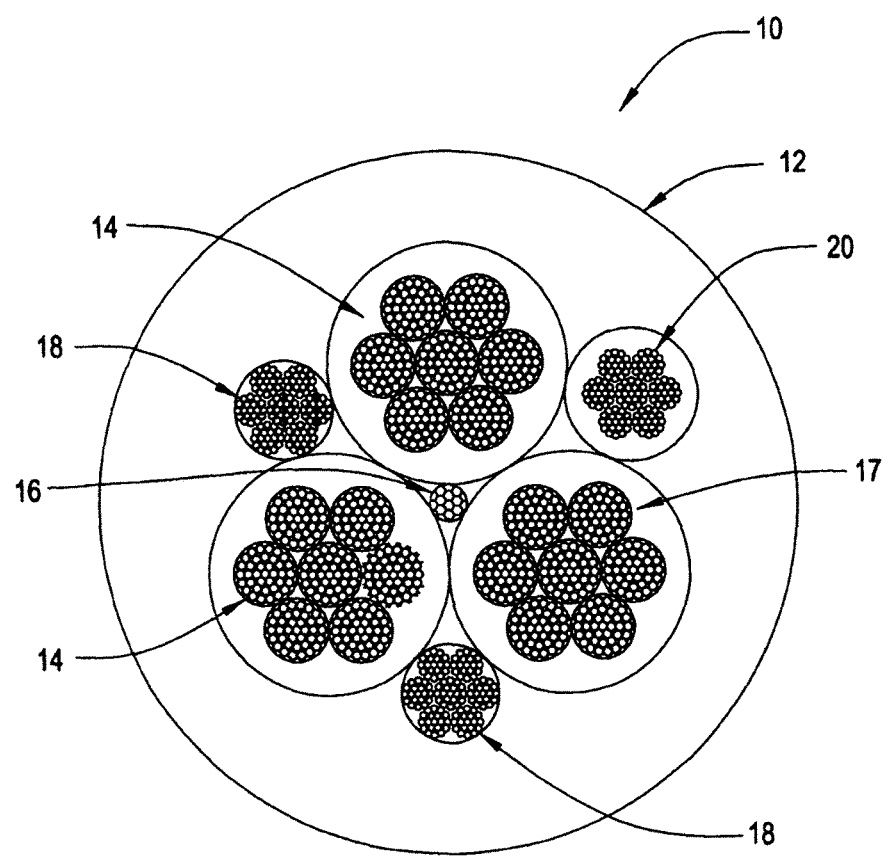
FIG. 2 shows an exemplary mining cable according to one embodiment FIGS. 3 and 4 (tables 7 and 8) are comparison and Petrella plots for Comp.A and Comp.B formulas as well as TPU1, FR TPU2, FR TPU3, FR TPU4, and FR TPU5 formulas.
Figure 3:
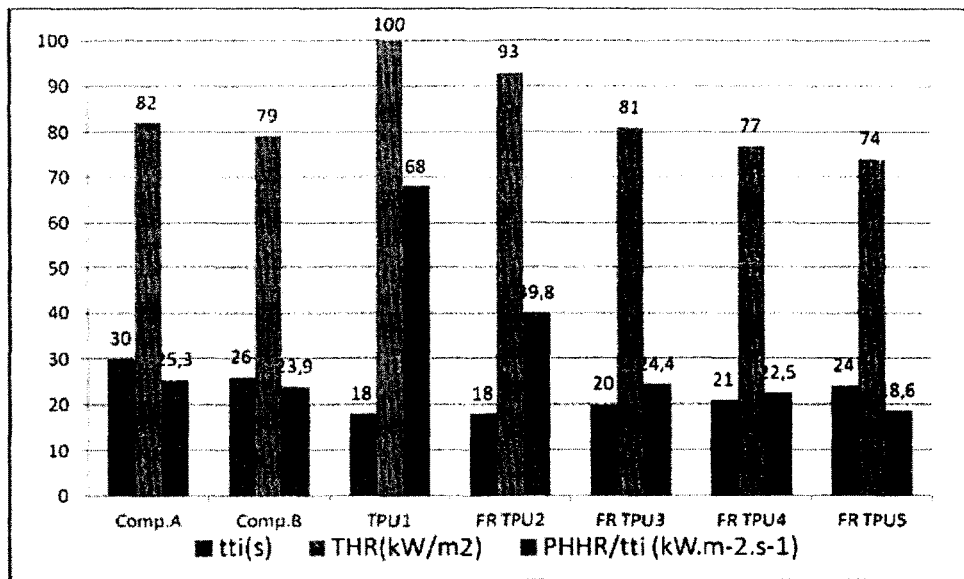
Figure 4:
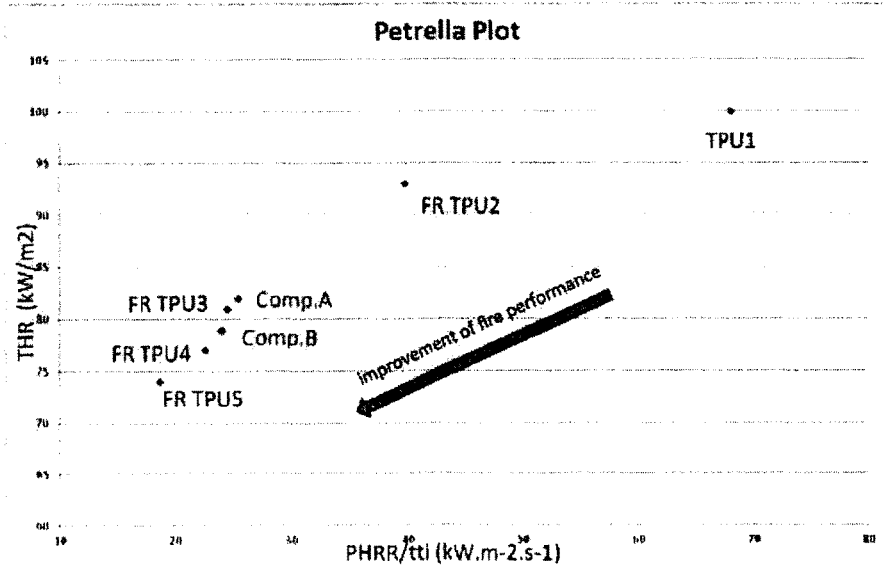
Figure 5:
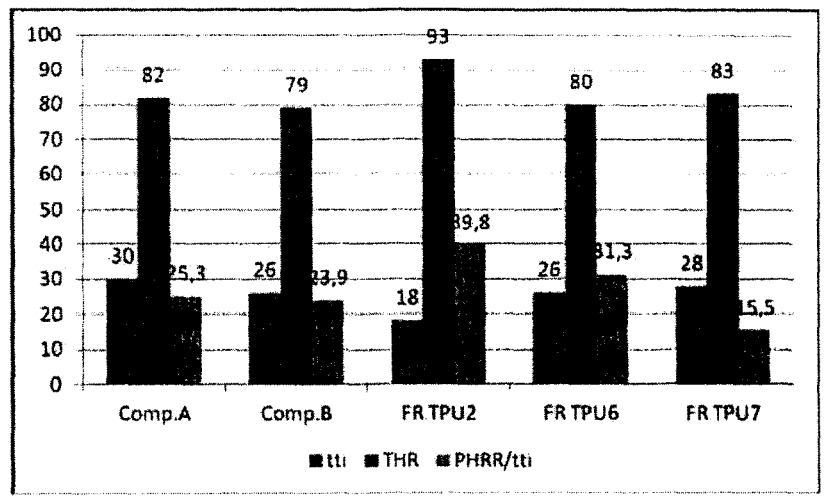
FIGS. 5 and 6 (tables 11 and 12) are calorimeter results (table 11) and a Petrella plot (table 12) for Comp.A and Comp.B formulas as well as TPU1, FR TPU2, FR TPU3, FR TPU4, and FR TPU5 formulas.
Figure 6:
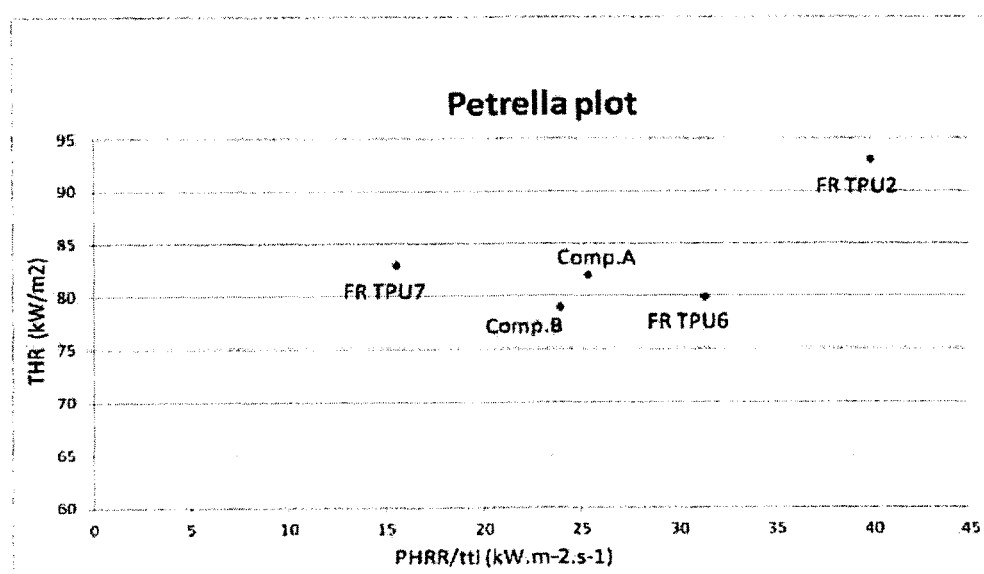

The present arrangement as shown in FIG. 2 illustrates an exemplary cable 10 that is used in the mining industry. Among other elements, cable 10 has an outer jacket 12, insulated conductors 14, a filler 16, ground wires 18 and a ground check wire 20.

In one example insulated conductors 14 are constructed as three separate 2 AWG (American Wire Gauge) tinned copper conductors insulated with ethylene propylene rubber. Filler 16 is positioned in the center of cable 10 to maintain the spacing of conductors 14. Ground wires 18 may be constructed of 7 AWG tinned copper covered in polyester tape. Ground check 20 may be constructed with 8 AWG tinned copper and insulted with polypropylene.

Applicants note that cable 10 is an exemplary construction of the type of cables, such as a mining cable that the present TPU/PVB polymer blend may be applied as a jacket. However, the salient features of the present arrangement, and in particular the polymer blend used for jacket 12, may be used on any applicable cable, heavy industry cable, automation cable or mining cable.

In one embodiment, as discussed in the summary above, jacket 12 may be constructed of a polymer blend based on TPU and PVB and including additional additives as discussed in detail below with respect to the following tables 3 as well, as the additional additives expanded on thereafter.

The following table 3 shows four different formulas for a cable jacket. The left column shows pure TPU (prior art). TPU1 is TPU/PVB at 75%/25% ratio. FR TPU1 according to one embodiment is TPU/PVB at 75%/25% ratio and including fire retardant additives. FR TPU2 according to one embodiment is TPU/PVB at 75%/25% ratio and including fire retardant additives (at a different ratio than FR TPU1). Applicants note that formulas FR TPU1 to FR TPU5 (see the below Table 5 for FR TPU3 to TPU5, and the below table 9 for FR TPU6 and FR TPU7), are based on phosphorous and melamine system. FR TPU6 and FR TPU7 are based on inorganic flame retardants.

The TPU contained in the following formulas is preferably polyether type TPU. It is noted that, melamine cyanurate is a fire retardant polymer additive. DEPAL (aluminium diethyl-phosphinate) is fire retardant polymer additive that has synergistic properties with melamine cyanurate when used in TPU, and zinc borate is also a fire retardant polymer additive.

TABLE 3

| | | COMPOSITIONS | | |
|---|---|---|---|---|
| Reference | Comp.A | TPU1 | FR TPU1 | FR TPU2 |
| TPU ether (1) | | 75 | 75 | 75 |
| PVB (2) | | 25 | 25 | 25 |
| DEPAL (3) | | — | 8.5 | 8.5 |
| MC (4) | | — | 8.5 | 8.5 |
| Zinc borate (5) | | — | 3 | 10 |

TABLE 3-continued

| | COMPOSITIONS | | | |
|---|---|---|---|---|
| Reference | Comp.A | TPU1 | FR TPU1 | FR TPU2 |
| ATH (6) | — | — | — | — |
| Nanoclay (7) | — | — | — | — |
| TOTAL (phr) | 100 | 100 | 120 | 127 |

In the present specification, compositions are described with per hundred rubber (phr), the rubber being the polymer blend of TPU and PVB.

The following is at least one commercial version of the above listed components from Table 3:

(1) Elastollan 1185 A 10: polyether-TPU with hardness 85 ShA from BASF GmbH, density=1.12;

(2) PVB BO: post consumer PVB from Hainault Plast coming from interlayer in laminated glass, obtained after specific purification treatment involving low impurities content, Melt Index (190° C., 2.16 kg)=1.8±0.1 g/10 min, density=1.08;

(3) MELAPUR MC 25: melamine cyanurate from BASF GmbH, density=1.7, average particle size D50=25 microns. It is a salt comprised of melamine and cyanuric acid held together by an extensive two-dimensional network of hydrogen bonds;

(4) Exolit OP 1230: aluminium diethyl phosphinate (also called DEPAL) from Clariant, phosphorous content P=23.3-24 wt %, average particle size D50=20-40 microns, density=1.35;

(5) Firebake ZB: zinc borate from Borax. It is a boron flame retardant used as smoke and afterglow suppressant and anti-arcing agent in polymer. Chemical and theorical composition are respectively $2ZnO.3B_2O_3.3.5H_2O$ and $48.05\%/37.45\%/14.5\%$ of $B_2O_3/ZnO/H_2O$ The average particle size is 9 microns measured by laser diffraction;

(6) APYRAL 40: aluminium trihydrate $Al(OH)3$ from Nabaltec. 99.5% of purity. Average particle size is D50=1.3 microns; specific surface area=3.5 $m^2/g$; density=2.4; and (7) Cloisite SE 3000: this nanoclay is a layered magnesium aluminium silicate platelets which are organically surface modified to permit complete dispersion in polymer matrix. Its thickness is 10 to 50 times smaller (ca. 1 mm) than conventional layered fillers such as kaolin with an exceptionally high aspect ratio of more than 100, allowing high improvement of the properties even at very low concentration of nanoclay.

PVB is an amorphous polymer with glass transition varying with plasticizer amount. PVB is a polyacetal produced by the condensation of polyvinyl alcohol with n-butyraldehyde in the presence of an acid catalyst. The condensation reaction produces 1,3-dioxane rings but some unreacted hydroxyl groups may be still present onto the polymer at the end of the reaction. A limited amount of acetate groups is also present because of production of polyvinyl alcohol from the hydrolysis of polyvinyl acetate. The final structure can be considered to be a random ter-polymer of vinyl butyral, vinyl alcohol and vinyl acetate, typically respectively 60-90%, 10-30% and 0-10%, but, in the preferred embodiment, 77-83, 18-23, 0-2%. Several producers propose various grades on the market, so variations in chemical composition can occur and the resulting recycled products could vary in composition and properties depending on the original source. PVB is also highly plasticized and different plasticizers could be present to different extents.

Hearafter is a non-exhaustive list of common plasticizers used in PVB: branched ethylene glycol ester between 20 and 30%; Hexanoate (ex: triethylene glycol di-2-ethylhexanoate, EASTMAN TEG-EH), adipate (dihexyladipate, SANTICIZER 367), phosphate (tricresylphosphate, Disflamoll TKP), phthalate (butyl phenyl phthalate, SANTICIZER 160), sulfonamide (ex: n-ethyltoluene sulfonamide, KETJENFLEX 9S), and or even dibutylsebacate.

Thermoplastic urethanes (TPU) belong to the family of thermoplastic elastomers (TPE) and are more precisely block copolymers. It had the same level of elasticity of crosslinked polymers (rubbers) while offering in the same time the same easy process as thermoplastics. It is the association on the same molecule of flexible segments (chain extenders), with a high extensibility and low glass transition temperature, with rigid crystallizing segments, with a high melting point, that gives the elastomeric feature. The ratio and molecular structure of these segments determines the specific features of the resin.

The polyurethanes are obtained commonly by reaction of polyols with polyisocyanates. These ones have to contain at least two functional groups per molecule respectively hydroxyl groups $R—(OH)_n$ and isocyanate group $R—(N=C=O)_n$. the reaction is driven in the presence of catalyst or by activation with ultraviolet light.

The polyisocyanates may be aromatic or aliphatic and the most commonly used are bi-functional. Aromatic examples are diphenylmethane diisocyanate (MDI) or toluene diisocyanate (TDI). The aliphatic ones include hexamethylene diisocyanate (HDI) or isophorone diisocyanate (IPDI).

The polyols may be either polyether polyols which are made by the reaction of epoxides with an active hydrogen containing compounds or polyester polyols which are made by the polycondensation of multifunctional carboxylic acids and polyhydroxyl compounds. Higher molecular weight polyols (molecular weights from 2,000 to 10,000) are used to make more flexible polyurethanes while lower molecular weight polyols make more rigid products. Polyether and polyester polyols give respectively by reaction with polyisocyanates polyether polyurethanes and polyester polyurethanes. Examples of polyols are glycol, diethylene glycol or triethyleneglycol.

The commonly used catalysts include tertiary amines such as triethylene diamine (TEDA or also called DABCO for 1,4-diazabicyclo[2.2.2]octane), and metallic compounds, such as dibutyltin dilaurate (DBTDL) or bismuth octanoate.

The main producers of TPU are BASF with Elastollan® range and Lubrizol with Estane® range. Considering characteristics of each type of TPU, the preferred embodiment is the use of polyether polyurethane.

It is noted that in addition to the three exemplary polymer formulas TPU, FR TPU 1 and FR TPU 2 set forth above, it is contemplated that certain variations may be included such as: a variation of the ratio of TPU/PVB (variations above and below 75%/25% provided that the amount of PVB remains below 50%; and a change in the amounts or types of combined fire retardant ingredients. The addition of compatibilization agents mainly polar group grafted polymers such as MA-g-PE (polyethylene-grafted maleic anhydride) or MA-g-EVA (Ethylene-vinyl acetate-grafted maleic anhydride). The preferred embodiment is the use of ethylene/vinyl acetate/carbon monoxide terpolymer such as Elvaloy 741 (Dupont).

In another embodiment PVB may employ plasticizers to aid in processing such as triethylenglycol-di-2-ethylbutyrate, and/or tetraethylenglycol-di-hepta noatedihexyladipate.

Once the formulation is set, the polymer blend is compounded to prepare for extrusion as a jacket onto cable 10. Before mixing, TPU is dried in an oven during 2 hours at 90° C. The mixtures may be manufactured either with a continuous process such as co-rotating twin screw extruder or co-kneader or with a batch equipment such as an internal mixer with tangential or intermeshing rotors. The laboratory samples from this application are made with an internal mixer 300 cc with mixing parameters described below. For industrial scale, compounding is made with a continuous process maintaining temperature zones below 175° C. avoiding degradation of recycled PVB. A screw speed at 75 rpm may be convenient. The addition of a certain amount of thermal stabilizer may be useful to preserve elastomers from thermal degradation during processing.

Mixing Parameters with an Internal Mixer 300 cc—
Heating of the mixer to 130° C.;
Incorporation of TPU polymer and mixing at 80 rpm until 160° C.;
Incorporation of PVB, flame retardants and other ingredients at 40 rpm; and
Unloading between 180 and 185° C. and homogenizing on external mixer at 150° C.

The compounds are put into 5 mm-slab shape after calendering in roll mill.

The following Table 4 shows the various testing results of TPU1, FR TPU1 and FR TPU2 when undergoing the mechanical testing required for ICEA S-75-381, the abrasion testing results under ISO/NFT® 4649 (Method B rolling sample), and finally the fire test results under 30 CFR §§ 7.406 and 7.408. The trials were done only on sheathed copper wire 1.5 mm² and material thickness ca. 1.2 mm.

TABLE 4

| | CHARACTERISTICS | | | |
|---|---|---|---|---|
| Property | Comp.A | TPU1 | FR TPU1 | FR TPU2 |
| Density | 1.12 | 1.113 | 1.15 | 1.14 |
| TS (psi/MPa) | 6526/45 | 6367/43.9 | 4495/31 | 5325/36.7 |
| EB (%) | 600 | 463 | 428 | 388 |
| Tear strength (ppi/N · mm) | | 154/27.2 | 150/26.3 | 105/18.3 |
| Abrasion loss (mm3) NFT4649-method B | 55 | 66 | 105 | 110 |
| Fire test (lab trials) type FT2 | Pass (lot of burning drops) | failed | Pass with a few burning drops | Pass without burning drops |

TS = tensile strength/EB = elongation at break

From the results it is evident that TPU1 TPU/PVB 75/25 was acceptable on some of the mechanical testing, but it did not meet the flame test requirements under 30 CFR § 7.408. This is because although PVB is relatively durable mechanically, and is a good match with TPU for mining cables, PVB degrades completely under the fire tests that are applied against standard grade TPU. In one embodiment, it is noted that during extrusion of TPU typically high temperatures are used so in the present application care is taken to not exceed 185° C. in the mass during extrusion to avoid degradation of the recycled PVB.

Formulas FR TPU1 and FR TPU2 however, also based on TPU/PVB 75/25 did pass 30 CFR 7.408 and in fact exceed pure TPU, because of the addition of fire retardant and UV resistance additives. According to one embodiment, suitable formulas for TPU/PVB at 75/25 ratio, also included HALS as well as melamine cyanurate, DEPAL and zinc borate (FR TPU2). In fact, FR TPU2 far outperformed standard grade TPU, experiencing no burning drops during flame test.

The tests above were performed on the exemplary embodiment of the TPU/PVB formulation in the context of certain tests for the mining industry. However as noted above, the present TPU/PVB formulation can be used on other cables such as those in industry automation. The following is another exemplary embodiment of the TPU/PVB formulation in the context of industry automation requirements.

There are not particular technical requirements for industry automation regarding physical properties but cable made with TPU jackets have to pass three flame tests: FT1; VW1; and 60332-1.1. (VW-1 flame propagation test according to UL 1581ed4 (08/2013)/UL 2556 (03/2013)/ASTM D 5207-14 (burner calibration); FT1 flame propagation test according to UL 1581ed4 (08/2013) and UL 2556 (03/2013) and ASTM D 5207-14 (burner calibration); and Vertical flame propagation on insulated conductor or cable according to IEC 60332-1-1 & 1-2 ed 1.0 (2004-07)).

In the present arrangement, as explained below, additional TPU/PVB blends were prepared for test abrasion loss, tensile strength and flexibility against comparison pure TPU Elastollan 1185 FHF and 1190FHF from BASF (named Comp.A and Comp.B below).

In order to compare fire performance of formulas a cone calorimeter was used on the Comp.A and Comp.B formulas as well as TPU1, FR TPU1, FR TPU2, FR TPU3, and FR TPU4.

| Test conditions cone calorimeter (ISO 5560 part 1&2) | | |
|---|---|---|
| | MEASUREMENT | Prescription |
| Heat Flux (Kw/m²) | 50 | 50 |
| Plate dimension | 100 × 100 × 3 | 100 × 100 × 3 |
| Horizontal or vertical plate | horizontal | |
| Spacing specimen/cone (mm) | 25 | 25 |
| With or without grid | with | |
| Air flow in exhaust tube (l/s) | 24 | 24 |

(The plates are preheated during 3 min at 180° C., then molded at 180° C./200 bars during 5 min and then cooled 5 min until 80° C.)

A Petrella plot is used to represent cone calorimeter results. (Ref: The Assessment of Full-Scale Fire Hazards from Cone calorimeter Data, R.V. Petrella, Journal of Fire Sciences 1994; 12; 14).

Fire-retarded materials should present a low fire load (i.e. total heat release, THR), have a long time to ignition ($t_{ign}$), a low peak heat release rate (PHRR), and so a low fire growth index (PHRR/$t_{ign}$).

PHRR/$t_{ign}$ is the ratio of peak of heat release rate to time to ignition. It represents the measure of contribution that the material concerned makes to a rapidly growing fire. THR is the measure of contribution that the material concerned makes to a fire of long duration.

A Petrella plot (THR vs PHRR/$t_{ign}$) is a schematic representation[i] of fire retarded materials to compare them easily. The lower the fire growth index and THR, the better the material is. In this plot system, higher values of PHHR/$t_{ign}$ are associated with a greater propensity to flashover.

One parameter a cone calorimeter analysis is the number called FIGRA which is the ratio between peak of heat release and time necessary to obtain this peak (KW/s). This ratio is defined as the fire growth rate index and must be the lowest possible.

Required values to be similar in properties to commercially available flame retardant TPUs named hereafter Comp.A and Comp.B:

Minimum technical requirements THR<86 and PHHR/$t_{ignition}$<29

Preferred technical values THR≤82 and PHHR/$t_{ignition}$≤22

The Comp.A and Comp.B formulas as well as TPU1, FR TPU2, FR TPU3, FR TPU4, and FR TPU5 formulas are set forth in the following table 5.

TABLE 5

| Reference | COMPOSITIONS | | | | | | |
|---|---|---|---|---|---|---|---|
| | Comp. A | Comp. B | TPU1 | FR TPU2 | FR TPU3 | FR TPU4 | FR TPU5 |
| TPU éther | | | 75 | 75 | 75 | 75 | 75 |
| PVB | | | 25 | 25 | 25 | 25 | 25 |
| DEPAL | | | — | 8.5 | 8.5 | 8.5 | 15 |
| MC | | | — | 8.5 | 8.5 | 8.5 | 15 |
| zinc borate | | | — | 3 | 10 | 7 | 4 |
| ATH | | | — | — | — | — | — |
| nanoclay | | | — | — | — | 3 | 3 |
| TOTAL (phr) | 100 | 100 | 100 | 120 | 127 | 127 | 137 |

The following table 7 shows the results of the cone calorimeter tests on the above formulas.

TABLE 6

| Reference | RESULTS | | | | | | |
|---|---|---|---|---|---|---|---|
| | Comp. A | Comp. B | TPU1 | FR TPU2 | FR TP3 | FR TPU4 | FR TPU5 |
| PHRR (kW/m$^2$) | 760 | 622 | 1250 | 716 | 488 | 462 | 446 |
| tti (s) | 30 | 26 | 18 | 18 | 20 | 21 | 24 |
| THR (kW/m$^2$) | 82 | 79 | 100 | 93 | 81 | 77 | 74 |
| PHRR/tti (kW · m$^{-2}$ · s-1) | 25.3 | 23.9 | 68 | 39.8 | 24.4 | 22.5 | 18.6 |
| FIGRA (kW · m-2 · s$^{-1}$) | 7.1 | 6.2 | 11.4 | 5.1 | 6.2 | 3.2 | 2.6 |

The following tables 7 and 8 show the comparison and Petrella plots. The following tables 9-12 illustrate formulations (table 9), test results (table 10), calorimeter results (table 11) and a Petrella plot (table 12) for formula FR TPU6 and FR TPU7, which are based on inorganic flame retardants.

TABLE 9

| Reference | COMPOSITIONS | | | | |
|---|---|---|---|---|---|
| | Comp.A | Comp.B | FR TPU2 | FR TPU6 | FR TPU7 |
| TPU ether (1) | | | 75 | 75 | 75 |
| PVB (2) | | | 25 | 25 | 25 |
| DEPAL (3) | | | 8.5 | — | — |
| MC (4) | | | 8.5 | — | — |
| Zinc borate (5) | | | 3 | — | — |
| ATH (6) | | | — | 28 | 23 |
| Nanoclay (7) | | | — | — | 5 |
| TOTAL (phr) | 100 | 100 | 120 | 128 | 128 |

TABLE 10

| Reference | RESULTS | | | | |
|---|---|---|---|---|---|
| | Comp.A | Comp.B | FR TPU2 | FR TPU6 | FR TPU7 |
| PHRR (kW/m$^2$) | 760 | 622 | 716 | 814 | 427 |
| tti (s) | 30 | 26 | 18 | 26 | 28 |
| THR (kW/m$^2$) | 82 | 79 | 93 | 80 | 83 |
| PHRR/tti (kW · m$^{-2}$ · s$^{-1}$) | 25.3 | 23.9 | 39.8 | 31.3 | 15.5 |
| FIGRA (kW · m-2 · s-1) | 7.1 | 6.2 | 5.1 | 5.5 | 2.9 |

The advantage of formulas FR TPU6 and FR TPU7 is the low smoke release compared with for example formula FR TPU2. The addition of nanoclay in formula allows a reduction of 47% of PHRR value and a slight increase of time to ignition.

In addition to the above tested formulas from all of the embodiments outlined above, in other embodiments or variations on the ones above, any number of additives may be added to the TPU/PVB base polymer blend depending on several different factors, including but not limited to processing issues, costs and final product specifications. The following list of additives is considered exemplary and not intended to be an exhaustive list or limit the scope of application.

Additives—

The compositions according to certain embodiments may additionally contain one or more conventional additives, for example compatibilizer, pigments, plasticizers, antioxidant, UV absorbers, light stabilizers, processing aids, metal deactivators, inorganic fillers, lubricants, rheology additives, blowing agents, antistatic agents, antihydrolysis agent etc. . . . .

The compositions according to certain embodiments may additionally contain fillers (reinforcing and not), such as: calcium and magnesium carbonates, talcum, chalk, kaolin, carbon black, carbon components, silicates, natural and synthetic fiber, wollastonite, bentonite, huntite etc. . . . .

The compositions according to certain embodiments may additionally contain compatibilisers such as polymers grafted or copolymerized with polar groups. In one preferred embodiment the compatibiliser is a non migrating TPU modifier ethylene/vinyl acetate/carbon monoxide (EVA/CO) copolymer such as Elvaloy 741 (Dupont).

Fire Retardant Ingredients—

In one embodiment, fire retardant additives act are those that may as diluents in gas phase or condensed phase, antidripping agents, smoke suppressants, and can promote char formation.

Inorganic Flame Retardants—
  aluminium trihydroxide, magnesium hydroxide (milled, ground or precipitated) without or with surface treatment improve filler dispersion mechanical properties and so on;
  silicates such as talc, silica and preferred phyllosilicates such as montmorillonite, kaolinite, mica; calcium carbonate, magnesium carbonate;
  microgranulated nanoclay such as montmorillonite, e.g. bis(hydrogenated tallow alkyl)dimethyl, salt with bentonite such as Cloisite 20 (BYK additives);
  metal oxides such as magnesium oxide, zinc oxide, antimony oxide, iron oxide mainly in synergy with ATH or MDH;
  aluminium oxide hydroxide (γ-AlO(OH)) mineral or boehmite (antidripping action);
  tin components such as zinc stannate (Flamtard from William Blythe or sureflam ZS from Wallace FR) Zinc hydroxystannate (flamtard or sureflam ZHS from Wallace FR);

expandable graphite as intumescent system;
zinc molybdate as smoke suppressant and more preferred zinc molybdate precipitated on inorganic core such as zinc borate or magnesium hydroxide (Kemgard products from Huber);
zinc borate: boron containing compounds act by stepwise release of water and formation of a glassy coating which protects the surface;

Nitrogen Components—
nitrogen based flame retardants such as melamine cyanurate (melapur MC), melamine phosphate (melapur MP), melamine polyphosphate (melapur 200), or mixture thereof;
melamine homologues: melem, melem, melon;

Halogenated Flame Retardants—
Halogenated components such as brominated components, chlorinated paraffin;
PTFE (antidripping) in intumescent system mainly with (di)pentaerythritol; Novolak
epoxy novolak resin (for antidripping);

Phosphorous Containing Flame Retardants—
they can be organic or inorganic compounds such as organophosphorous, red phosphorous, phosphoric acid derivatives, oligomeric phosphate esters, phosphate derivatives (DHOP, THOP) but not limited. The most important phosphorus-containing flame retardants are phosphate esters, phosphonates and phosphinates.

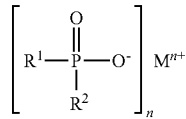

general structure of metal phosphinate

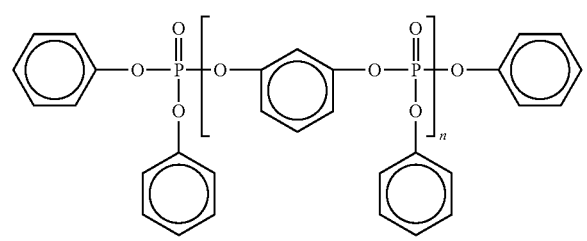

n = 1.7 resorcinol bis (diphenyl phosphate) (RDP)

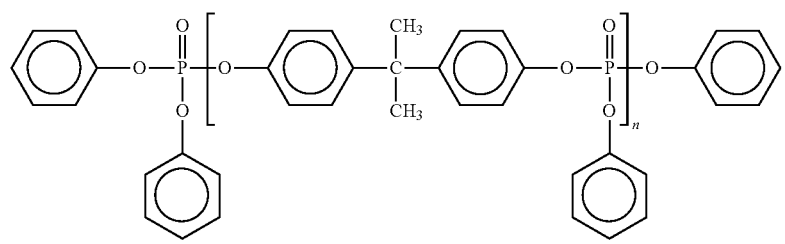

(n=1-2) bis-phenol A bis (diphenyl phosphate)(BDP)
ammonium polyphosphate (APP, such as FR CROS S10 from Budenheim)
examples of phosphorous plasticizers: tricresylphosphate (TCP, ex Disflamoll TKP from Lanxess), triphenylphosphate (TPP, ex Disflamoll TP from Lanxess), 2-ethylhexyldiphenylphosphate (Santicizer 141 from Valtris)
polyhedral oligomeric silsesquioxane (POSS) enhanced Fire Retardation. Compared to common fire retarded plastics, polymers containing POSS show delayed combustion and major reductions in heat evolution.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

The invention claimed is:
1. A cable, said cable comprising:
one or more conductors; and
a jacket,
wherein said jacket is made from a composition including a polymer blend of thermoplastic polyurethane (TPU), and Polyvinylbutyral (PVB), with the ratio of PVB to TPU being up to 49% PVB by weight of the total weight of the polymer blend, the remainder of the polymer blend being TPU.
2. The cable as claimed in claim 1, wherein said the ratio of PVB to TPU being substantially 25% PVB to 75% TPU by weight over the total weight of the polymer blend.
3. The cable as claimed in claim 1, wherein said cable further comprises any one of filler, ground wire and ground check wire.
4. The cable as claimed in claim 1, wherein said composition further comprises one or more fire retardants.
5. The cable as claimed in claim 4, wherein said fire retardants are selected from the group consisting of aluminium trihydroxide, magnesium hydroxide, silicates, talc, silica and phyllosilicates, montmorillonite, kaolinite, mica, calcium carbonate, magnesium carbonate, microgranulated nanoclay, montmorillonite, bis(hydrogenated tallow alkyl) dimethyl, salt with bentonite, metal oxides, magnesium oxide, zinc oxide, antimony oxide, Fe2O3 with ATH or MDH, tin components, zinc stannate, Zinc hydroxystannate, expandable graphite, zinc molybdate, zinc borate, magnesium hydroxide, zinc borate, melamine cyanurate, melamine phosphate, melamine polyphosphate, melamine homologues, halogenated flame retardants, brominated components, chlorinated paraffin, PTFE with (di)pentaerythritol, epoxy novolak resin, aluminium oxide hydroxide mineral or boehmite, phosphorous containing flame retardants, organophosphorous, red phosphorous, phosphoric acid derivatives, oligomeric phosphate esters, phosphate derivatives, ammonium polyphosphate, and polyhedral oligomeric silsesquioxane (POSS).

6. The cable as claimed in claim 1, wherein said composition further comprises HALS (hindered amine light stabilizers) as a UV stabilizer.

7. The cable as claimed in claim 1, wherein said PVB is recycled.

8. The cable as claimed in claim 1, wherein said composition further comprises a PVB plasticizer selected from the group consisting of, branched ethylene glycol ester between 20 and 30%; triethylene glycol di-2-ethylhexanoate, dihexyladipate, tricresylphosphate, butyl phenyl phthalate, n-ethyltoluene sulfonamide, and dibutylsebacate.

9. The cable as claimed in claim 1, wherein said composition further comprises a compatibilization agent selected from the group consisting of grafted polymers, MA-g-PE (polyethylene-grafted maleic anhydride) or EVA (Ethylene-vinyl acetate).

10. The cable as claimed in claim 1, wherein said PVB has different amount of co-monomers vinyl butyral, vinyl alcohol and vinyl acetate over the total weight of PVB.

11. The cable as claimed in claim 1, wherein said composition further includes 0.3 parts by weight of Hals per 100 part by weight of the polymer blend.

12. The cable as claimed in claim 1, wherein said composition further includes 0.3 parts by weight of Hals per 100 part by weight of the polymer blend, 10 parts by weight of melamine cyanurate per 100 part by weight of the polymer blend, and 10 parts by weight of aluminum diethyl-phosphinate (DEPAL) per 100 part by weight of the polymer blend.

13. The cable as claimed in claim 1, wherein said composition includes 0.3 parts by weight of Hals per 100 part by weight of the polymer blend, 8.5 parts by weight of melamine cyanurate per 100 part by weight of the polymer blend, 8.5 parts by weight of DEPAL per 100 part by weight of the polymer blend, and 3 parts by weight of zinc borate per 100 part by weight of the polymer blend.

14. The cable as claimed in claim 1, wherein said cable is a mining cable that passes the mechanical standards of Insulated Cable Engineers Association (ICEA) ICEA S75-381.

15. The cable as claimed in claim 1, wherein said cable is a mining cable that passes the abrasion testing requirements of ISO/NFT® 4649.

16. The cable as claimed in claim 1, wherein said cable is a mining cable that passes the SHA (Mine Safety and Health Administration) fire safety standards of 30 CFR §§ 7.402, 7.406, and 7.408.

17. The cable as claimed in claim 1, wherein said composition further includes 8.5 parts by weight of melamine cyanurate per 100 part by weight of the polymer blend, 8.5 parts by weight of DEPAL per 100 part by weight of the polymer blend, and 3 parts by weight of zinc borate per 100 part by weight of the polymer blend.

18. The cable as claimed in claim 1, wherein said composition further includes 8.5 parts by weight of melamine cyanurate per 100 part by weight of the polymer blend, 8.5 parts by weight of DEPAL per 100 part by weight of the polymer blend, and 10 parts by weight of zinc borate per 100 part by weight of the polymer blend.

19. The cable as claimed in claim 1, wherein said composition further includes 8.5 parts by weight of melamine cyanurate per 100 part by weight of the polymer blend, 8.5 parts by weight of DEPAL per 100 part by weight of the polymer blend, 7 parts by weight of zinc borate per 100 part by weight of the polymer blend, and 3 parts by weight of nanoclay per 100 part by weight of the polymer blend.

20. The cable as claimed in claim 1, wherein said composition further includes 15 parts by weight of melamine cyanurate per 100 part by weight of the polymer blend, 15 parts by weight of DEPAL per 100 part by weight of the polymer blend, 4 parts by weight of zinc borate per 100 part by weight of the polymer blend, and 3 parts by weight of nanoclay per 100 part by weight of the polymer blend.

21. The cable as claimed in claim 1, wherein said cable is an automation cable that passes the VW-1 flame propagation testing and standards according to UL 1581ed4 (08/2013)/ UL 2556 (03/2013)/ASTM D 5207-14; FT1 flame propagation test according to UL 1581ed4 (08/2013) and UL 2556 (03/2013) and ASTM D 5207-14; and Vertical flame propagation on insulated conductor or cable standards according to IEC 60332-1-1 & 1-2 ed 1.0 (2004-07)).

22. The cable as claimed in claim 1, wherein said jacket surrounds one or several insulated conductors.

23. The cable as claimed in claim 1, wherein said PVB has different amount of co-monomers, including 60-90% by weight of vinyl butyral, 10-30% by weight of vinyl alcohol, and 0-10% by weight of vinyl acetate, over the total weight of PVB.

* * * * *